United States Patent
Allain

(10) Patent No.: US 8,780,891 B2
(45) Date of Patent: Jul. 15, 2014

(54) MULTIMEDIA CONTENT SHARING VIA AUDIO-VIDEO COMMUNICATION

(75) Inventor: Mickaël Allain, Louannec (FR)

(73) Assignee: Orange, Paris (FR)

(*) Notice: Subject to any disclaimer, the term of this patent is extended or adjusted under 35 U.S.C. 154(b) by 272 days.

(21) Appl. No.: 12/933,172

(22) PCT Filed: Mar. 16, 2009

(86) PCT No.: PCT/FR2009/050428
§ 371 (c)(1),
(2), (4) Date: Sep. 17, 2010

(87) PCT Pub. No.: WO2009/122078
PCT Pub. Date: Oct. 8, 2009

(65) Prior Publication Data
US 2011/0019684 A1    Jan. 27, 2011

(30) Foreign Application Priority Data

Mar. 17, 2008 (FR) ..................... 08 51718

(51) Int. Cl.
*G06F 15/16* (2006.01)
*H04L 12/28* (2006.01)
*H04L 12/66* (2006.01)
*H04L 29/06* (2006.01)

(52) U.S. Cl.
USPC ........... 370/352; 370/254; 370/252; 370/401; 709/227

(58) Field of Classification Search
USPC ......... 370/352, 401, 260, 392, 254, 252, 389; 709/245, 203–208, 222–231, 237–238; 379/93.09, 201.01; 455/412.1; 348/14.08
See application file for complete search history.

(56) References Cited

U.S. PATENT DOCUMENTS

| | | | |
|---|---|---|---|
| 7,761,579 B2* | 7/2010 | Khasnabish | 709/227 |
| 2007/0126862 A1* | 6/2007 | Even et al. | 348/14.08 |

(Continued)

FOREIGN PATENT DOCUMENTS

| | | |
|---|---|---|
| GB | 2 413 729 | 11/2005 |
| JP | 2005-057676 | 3/2005 |

(Continued)

OTHER PUBLICATIONS

"A New Remote Configurable Firewall System for Home-use Gateways", IEEE Consumer Communications and Networking Conference, 2005.*

(Continued)

*Primary Examiner* — Wing F Chan
*Assistant Examiner* — Raji Krishnan
(74) *Attorney, Agent, or Firm* — Knobbe Martens Olson & Bear LLP

(57) ABSTRACT

A communications system sets up a multimedia session between two terminals ($STB_A$, $SV_B$) each connected to a home gateway ($GW_A$, $GW_B$), these gateways being connected to each other by a telecommunications network (R). At least a first of these gateways ($GW_B$), using the signaling protocol of a Voice over IP session (SVIP) set up between terminals ($VIP_A$, $VIP_B$) connected to these gateways ($GW_A$, $GW_B$), sends the second of these gateways the capabilities of at least one first terminal ($SV_B$) connected to the first gateway ($GW_B$). The second gateway ($GW_A$) determines at least one multimedia service offered by the first terminal ($SV_B$) as a function of said capabilities The second gateway ($GW_A$) supplies to at least one second terminal ($STB_A$) to which it is connected information necessary for setting up a multimedia session with the first terminal ($SV_B$) to access the multimedia service if the capabilities of the second terminal ($STB_A$) allow it.

5 Claims, 2 Drawing Sheets

(56) References Cited

U.S. PATENT DOCUMENTS

2007/0286162 A1* 12/2007 Fabbrizio et al. ............. 370/352
2009/0083426 A1* 3/2009 Cagenius ...................... 709/227
2009/0135839 A1* 5/2009 Khasnabish .................. 370/401
2011/0182205 A1* 7/2011 Gerdes et al. ................. 370/254

FOREIGN PATENT DOCUMENTS

| | | |
|---|---|---|
| JP | 2008-017122 | 1/2008 |
| WO | WO 03/055193 | 7/2003 |
| WO | WO 2006/132573 | 12/2006 |

OTHER PUBLICATIONS

Krishnamurthy et al "MSF Session Border Gateway Requirements", "MSF-PS-SBG-001.00-Final", "MultiService Forum Product Specification", dated Apr. 27, 2006.*

Notice of Reasons for Rejection mailed Mar. 19, 2013, for Japanese Application No. 2011-500265.

* cited by examiner

MULTIMEDIA CONTENT SHARING VIA AUDIO-VIDEO COMMUNICATION

RELATED APPLICATIONS

This is a U.S. National Phase Application under 35 USC §371 of International Application PCT/FR2009/050428, filed on Mar. 16, 2009.

This application claims the priority of French application Ser. No. 08/51718 filed on Mar. 17, 2008, the content of which is hereby incorporated by reference.

BACKGROUND OF THE INVENTION

The field of the invention is telecommunications networks that enable terminals to access multimedia services.

The invention relates more particularly to multimedia services offered to terminals connected to a network via an access point or gateway.

The invention thus finds one particularly beneficial but non-limiting application to offering a multimedia service to a terminal connected to a home gateway in a home network or to a roaming terminal connected to the Internet via a wireless access point (Hot Spot).

In the context of the present invention, the term multimedia is to be understood in a broad sense, a multimedia service being in particular a service providing access to multimedia documents (images, videos, digital audio files, messaging services and, more generally, any service requiring a transfer of digital data between terminals (web server access, file transfer, etc.).

In the current state of the art, communication of digital data between two terminals on different local area networks requires various parameters of the terminals to be set in order to be able to set up a call, which can be a complicated process, especially for non-expert users.

For example, to transfer files between two computers connected to different local area networks, it is necessary to configure each of the computers with the FTP (File Transport Protocol) address and the password of the remote computer.

If the users of the computers then wish to set up a connection between another two of their terminals, for example to download a video stream from a video server of the first user to the set-top box of the user of the other network, it is necessary to configure each of the terminals independently, the configuration of the first computers being such that it is not possible to avoid this task.

OBJECT AND SUMMARY OF THE INVENTION

One object of the invention is to make it possible to set up multimedia calls between terminals of different local area networks without encountering the drawbacks of the prior art.

A first aspect of the invention is directed to a method that can be used by a first home gateway to supply at least one first terminal connected to that gateway with information for accessing at least one multimedia service offered by at least one remote terminal connected to a second home gateway, these gateways being connected by a telecommunications network.

This method includes the following steps:
  setting up a Voice over IP session between a terminal connected to the first gateway and a terminal connected to the second gateway;
  the first gateway receiving capabilities of at least one remote terminal connected to the second gateway using the signaling protocol of the Voice over IP session;
  the first gateway determining as a function of the above-mentioned capabilities at least one multimedia service offered by the remote terminal;
  supplying the first terminal with information necessary for setting up a multimedia session with the remote terminal to access the multimedia service if the capabilities of the first terminal allow it.

Another aspect of the invention provides a home gateway including means for setting up a Voice over IP session between a terminal connected to this gateway and a terminal connected to a second home gateway connected to the first gateway by a telecommunications network.

This gateway includes:
  means for receiving capabilities of at least one remote terminal connected to the second gateway using the signaling protocol of the Voice over IP session;
  means for determining at least one multimedia service offered by the remote terminal as a function of the above-mentioned capabilities; and
  means for supplying at least one terminal connected to this gateway with the information necessary for setting up a multimedia session with the remote terminal to access the multimedia service if the capabilities of that terminal allow it.

An aspect of the invention proposes generally to exploit a Voice over IP session set up between terminals of different local area networks to supply dynamically and automatically to the terminals of those networks the information necessary to set up one or more multimedia sessions with the terminals of the other network without requiring users to set parameters of the terminals and without it being necessary for the terminals to take part in the voice session.

Of course, at least one of the above-mentioned Voice over IP terminals may be integrated into a home gateway.

At least one Voice over IP terminal may also be a Video over IP terminal with a channel reserved for voice calls.

To this end, using the signaling protocol of the Voice over IP session, one of the gateways sends the functional characteristics or capabilities of the terminals of its network, the other gateway exploiting those functional characteristics or capabilities to offer the terminals of its own network the services accessible to the remote terminals.

In one particular embodiment of the invention, each gateway knows the capabilities of the terminals to which it is connected and compares those capabilities with the capabilities of the remote terminals received in the signaling protocol of the Voice over IP session in order to be certain, before offering a service to a terminal, that the terminal is in fact in a position to access that service.

For example, if a home gateway receives information to the effect that a terminal connected to the other home gateway offers the RTSP (Real-Time Streaming Protocol) server function, before offering that service to a local terminal, it verifies that the local terminal has an RTSP client.

In one particular embodiment of the invention, the first gateway sends the second gateway the capabilities of at least one terminal to which it is connected using the signaling protocol of the Voice over IP session.

Thus each of the home gateways communicates to the other home gateway the capabilities of the terminals to which it is connected so that sessions can be initiated by terminals of either network.

This second aspect of the invention also provides a method that can be used by a first home gateway to supply at least one remote terminal connected to a second home gateway with information for setting up a multimedia session with a local terminal connected to said first gateway, these gateways being connected by a telecommunications network.

This method includes the following steps:
- setting up a Voice over IP session between a terminal connected to the first gateway and a terminal connected to the second gateway;
- sending the second gateway capabilities of the local terminal representative of a multimedia service that can be provided by the local terminal using the signaling protocol of the Voice over IP session;
- configuring a firewall of the first gateway to enable setting up of a connection to the local terminal initiated by a remote terminal connected to the second gateway, the configuration taking account of the capabilities of the remote terminal.

An aspect of the invention provides a home gateway including means for setting up a Voice over IP session between a terminal to which it is connected and a terminal connected to a second gateway, these gateways being connected by a telecommunications network.

This gateway includes:
- means for sending the second gateway, using the signaling protocol of the Voice over IP session, capabilities of a local terminal connected to the first gateway representative of a multimedia service that may be provided by the local terminal;
- means for configuring a firewall of the first gateway to enable setting up a connection to the local terminal initiated by a remote terminal connected to the second gateway, the configuration taking account of the capabilities of the remote terminal.

Thus this aspect of the invention proposes that a first gateway collect the capabilities of the terminals of its local area network and send those capabilities to a remote gateway using the signaling protocol of a current Voice over IP session, with the result that the other gateway is able to offer the services associated with those capabilities to the terminals of its own local area network.

The person skilled in the art understands that more often than not it is necessary to open a communication port of the gateway offering the services on its local area network, failing which the firewall protecting that local area network would prevent the setting up of the sessions initiated by the terminals of the other network, referred to as "incoming sessions".

In one particular implementation of the invention, the opening of the communication port of a gateway to set up a multimedia session with a terminal connected to the other gateway is temporary.

For example, the communication port is held open by a gateway for as long as the Voice over IP session is active or for as long as a multimedia session set up on the basis of the information exchanged via the signaling protocol of the Voice over IP session is active, the communication port being closed as soon as there is no longer any session active between the two gateways.

In one implementation of the invention, the firewall configuration depends on rules defined by the user, which rules may for example specify that, during a predetermined number of sessions, the firewall authorizes incoming sessions during the Voice over IP session up to termination of the last session set up between the gateways.

In any event, the invention proposes to manage this security feature in a manner that is transparent for the user.

In one particular implementation of the invention, each gateway communicates regularly with the terminals to which it is connected to obtain their capabilities.

Accordingly, when a terminal offering services enters or leaves the local area network, the gateway of that network is able to inform the other gateway of these service changes using the voice signaling protocol (of the current session), with the result that the other gateway is in turn able to inform the terminals of its own network of these changes.

In one particular implementation of the invention, a gateway communicates with the terminals to which it is connected using the UPnP (Universal Plug and Play) protocol.

In one implementation of the invention, the Voice over IP signaling protocol is the Session Initiation Protocol (SIP) and the capabilities of the terminals are conveyed in INVITE messages (on initialization of the Voice over IP session) or RE-INVITE messages (after setting up the Voice over IP session).

By means of an aspect of the invention, each terminal of a local area network can show the user the services offered by the terminals of the remote network dynamically and without any configuration by the user, which is highly advantageous.

For example, for terminals equipped with a screen, a pop-up window may offer the user activation of a service. If the user decides to activate the service, and provided that the corresponding port is open on the remote gateway, a multimedia session is set up between the terminal of the user and the terminal of the remote network offering the service.

Another aspect of the invention provides a communications system for setting up a multimedia session between two terminals each connected to a home gateway, these gateways being interconnected by a telecommunications network.

In this system:
- at least a first of the gateways sends the second of the gateways, using the signaling protocol of a Voice over IP session set up between terminals connected to these gateways, capabilities of at least one first terminal connected to the first gateway;
- the second gateway determines as a function of the above-mentioned capabilities at least one multimedia service offered by the first terminal; and
- the second gateway supplies at least one second terminal to which it is connected with information necessary for setting up a multimedia session with the first terminal to access the multimedia service if the capabilities of the second terminal allow it.

In one particular implementation of the invention, the steps of the above methods are determined by instructions of computer programs.

An aspect of the invention provides a computer program on an information medium, the program being adapted to be executed in a gateway or more generally in a computer and including instructions adapted to execute the steps of at least one of the above methods.

This program may use any programming language and take the form of source code, object code or a code intermediate between source code and object code, such as a partially-compiled form, or any other desirable form.

An aspect of the invention provides a computer-readable information medium containing instructions of a computer program as referred to above.

The information medium may be any entity or device capable of storing the program. For example, the medium can include storage means, such as a ROM, for example a CD ROM or a micro-electronic circuit ROM, or magnetic storage means, for example a floppy disk or a hard disk.

Also, the information medium may be a transmissible medium such as an electrical or optical signal, which may be routed via an electrical or optical cable, by radio or by other means. The program of the invention can in particular be downloaded over an Internet-type network.

Alternatively, the information medium may be an integrated circuit in which the program is incorporated, the circuit being adapted to execute the method in question or to be used in its execution.

BRIEF DESCRIPTION OF THE DRAWINGS

Other features and advantages of the present invention emerge from the following description given with reference to drawings and appendices that illustrate one non-limiting embodiment of the invention and in which.

DETAILED DESCRIPTION OF THE DRAWINGS

Figure 1:
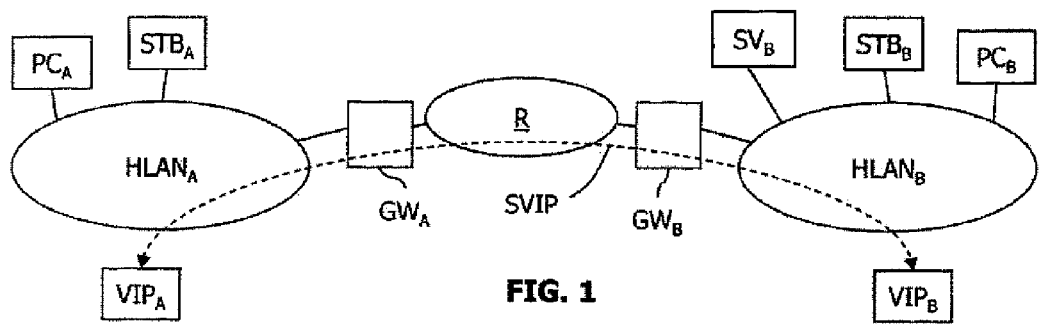
FIG. 1 is a diagram representing a communications system in which one particular embodiment of the present invention may be implemented.

FIG. 1 represents a communications system of one particular embodiment of the invention.

This example relates to two home local area networks $HLAN_A$ and $HLAN_B$ interconnected by home gateways $GW_A$ and $GW_B$ interconnected by a telecommunications network R.

In the embodiment described here, the network R is the Internet.

In this example three terminals are connected to the home local area network $HLAN_A$, namely:
 a personal computer $PC_A$;
 a set-top box $STB_A$; and
 a Voice over IP terminal $VIP_A$.

Four terminals are connected to the home local area network $HLAN_B$, namely:
 a video server $SV_B$;
 a set-top box $STB_B$;
 a personal computer $PC_B$; and
 a Voice over IP terminal $VIP_B$.

Note that the terminals connected to the home local area networks of the invention may be fixed or mobile terminals.

A Voice over IP session SVIP indicated by a dashed-line double-headed arrow is set up between the Voice over IP terminals $VIP_A$ and $VIP_B$ via the home gateways $GW_A$ and $GW_B$.

Figure 2:
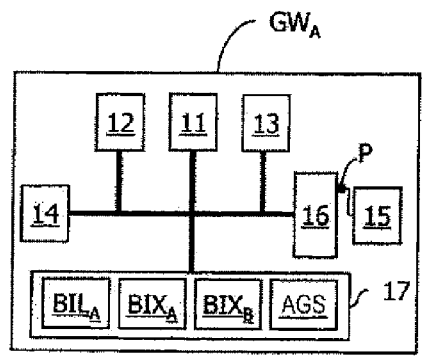
FIG. 2 is a diagram representing the hardware architecture of a gateway of the invention.

FIG. 2 shows a home gateway $GW_A$ of one particular embodiment of the invention. In this example, the gateway $GW_B$ is identical.

In the example described here, this gateway $GW_A$ has the hardware architecture of a computer. It includes a processor 11, a random access memory (RAM) 12, a read-only memory (ROM) 13, communications means 14 for communicating with the terminals of the local area network $HLAN_A$, and communications means 15 protected by a firewall 16 for communicating with the Internet R.

In the example described here, the home gateway $GW_A$ includes a non-volatile rewritable flash memory 17 for storing data structures described below with reference to the appendices.

Figure 4:
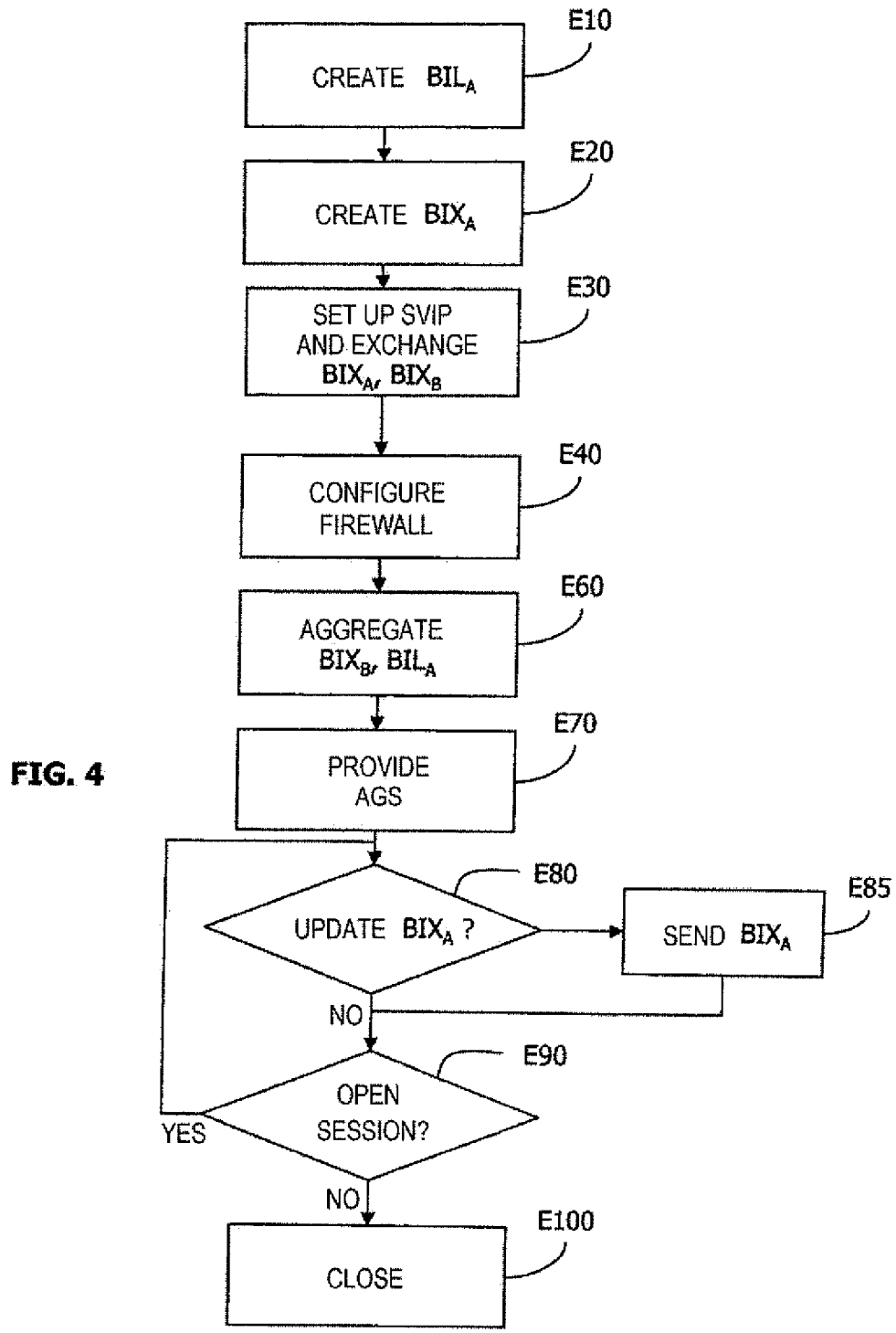
FIG. 4 is a diagram representing the main steps of methods of one particular implementation of the invention; and Appendices 1 to 4 represent data structures that may be used in gateways of one particular implementation of the invention.

The read-only memory 13 constitutes a storage medium of the invention storing a computer program of the invention including instructions for executing the steps of the methods of the invention represented in flowchart form in FIG. 4.

According to the invention, each of the gateways $GW_A$, $GW_B$ is able to collect the capabilities of the equipments of its local area network $HLAN_A$, $HLAN_B$.

In the embodiment of the invention described here, these capabilities are stored in the non-volatile rewritable memory 17 in a data structure $BIL_A$ local to the gateway $GW_A$.

Appendix 1 gives an example of the local structure $BIL_A$.

In the example described here, that structure includes a "security weight" field that defines the level of integrity of the information that is exchanged.

For example, the greater the weight, the higher the security level. Accordingly, in one implementation
 a zero weight means that all sessions initiated by the remote terminals are accepted;
 a maximum weight prohibits any connection attempt; and
 an intermediate weight prohibits only some of the sessions initiated by the remote terminals, as a function of the capabilities of those terminals.

In any event, the firewall is configured automatically on the basis of the capabilities of the remote terminals.

In the implementation described here, the security weight has the value "ZERO", which means that the rules of the firewall of the home gateway $GW_A$ are applied as a function of the capabilities of the remote terminals, with no additional restrictions.

In the implementation of the invention described here, the structure $BIL_A$ inventories the capabilities of the terminals $PC_A$ and $STB_A$ of the local area network $HLAN_A$.

To be more precise, this file must be interpreted as follows:
 a capability of the personal computer $PC_A$ to provide a messaging service, the e-mail address of the computer user being pierre.martin@orange.-fr;
 a capability of the personal computer $PC_A$ to provide a file transfer service, the address of this computer in the local area network $HLAN_A$ being the IP address 168.1.1.12, with the login and password "anonymous";
 a capability of the machine $STB_A$ to provide a set-top box service, the address of the set-top box in the local area network $HLAN_A$ being the IP address 168.1.1.15, with the login "STB" and with no password; and
 a capability of the personal computer $PC_A$ to provide a web server service, the IP address of the web server in the local area network $HLAN_A$ being the IP address 168.1.1.20; this web server may be accessed at the URL http://168.1.1.20/photos.

According to the invention, the capabilities of the local area network $HLAN_A$ must be communicated to the remote gateway $GW_B$ using the signaling protocol of the Voice over IP session SVIP.

Now, as is known in the art, the machines $PC_A$ and $STB_A$ cannot be accessed from the network $HLAN_B$ at the IP addresses given in the structure $BIL_A$, as those addresses are specific to the local area network $HLAN_A$.

The gateway $GW_A$ therefore creates, from the local information base $BIL_A$ an exchange structure $BIX_A$ usable by the terminals of the local area network $HLAN_B$.

Appendix 2 shows this structure $BIX_A$.

It is obtained by substituting for each of the IP addresses of the terminals of the network $HLAN_A$ in the local structure $BIL_A$ the IP address of the gateway $GW_A$ on the Internet R. This network address translation (NAT) method is known to the person skilled in the art.

Appendix 3 gives the equivalent exchange structure $BIX_B$ obtained by the gateway $GW_B$ of the network $HLAN_B$.

In the example described here, it is clear that the gateway $GW_B$ offers the terminals of the local area network $HLAN_A$ a file transfer service on the personal computer $PC_B$ and a RTSP server service on the video server $SV_B$.

In the implementation of the invention described here, the gateways $GW_A$ and $GW_B$ exchange the exchange structures $BIX_A$ and $BIX_B$ using the signaling protocol of the Voice over IP session SVIP.

The structures $BIX_A$, $BIX_B$ may in particular be exchanged by the gateways in the fields of the INVITE message on initialization of the Voice over IP session.

The structures $BIX_A$, $BIX_B$ may also be exchanged by the gateways in the fields of a RE-INVITE message during a Voice over IP session.

Consider next the gateway $GW_A$ that receives the exchange structure $BIX_B$ sent by the gateway $GW_B$.

According to the invention, the gateway $GW_A$ determines the services offered by the terminals of the network $HLAN_B$ from the structure $BIX_B$.

In the example described here, it determines that the terminals of the network $HLAN_B$ offer a file transfer service and an RTSP server service.

The gateway $GW_A$ then determines which terminals of its network $HLAN_A$ have the capabilities needed to access the services offered by the terminals of the network $HLAN_B$.

For this purpose, the gateway $GW_A$ compares the exchange structure $BIX_B$ received from the gateway $GW_B$ with its local structure $BIL_A$.

The gateway $GW_A$ then constructs a data aggregation structure AGS for the terminals of its own network $HLAN_A$.

Referring to FIG. 4, it is clear that this structure makes it possible to offer to the personal computer $PC_A$ a messaging service at the address of the personal computer $PC_B$ and a file transfer service to the IP address 200.20.156.12 of the gateway $GW_B$.

In the example described here, the security weight is fixed at the value "ZERO", which indicates that both these services are offered to the computer $PC_A$ without requesting checking of the integrity of data from the network $HLAN_B$.

Note that the login "mdd" and the password "martin" are contained in the aggregation structure, with the result that the computer $PC_A$ may be configured automatically without user intervention, which is highly advantageous.

Similarly, the aggregation structure AGS offers the set-top box $STB_A$ an RTSP server service of the video server $SV_B$ of the network $HLAN_B$ and the necessary information for configuring the set-top box $STB_A$ automatically, namely the IP address of the server and the login and password information.

In the implementation described here, each piece of equipment $PC_A$, $STB_A$ of the local area network $HLAN_A$ is automatically configured on reception of the aggregation structure AGS.

In the example described here, a television screen, not shown, is connected to the set-top box $STB_A$ and displays to the user the video service offered by the terminal $SV_B$ of the network $HLAN_B$.

The user is able to access this service by simply clicking on their remote control, with no need to configure the set-top box, which is highly advantageous.

Figure 3:
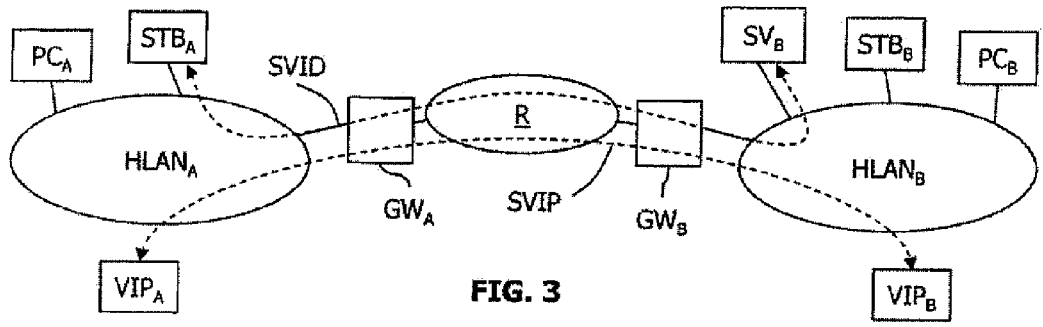
FIG. 3 represents the FIG. 1 system after the invention has been implemented.

When the user accesses this service, a multimedia session SVID represented by a double-headed dashed-line arrow is set up between the set-top box $STB_A$ and the video server $SV_B$ via the gateways and the Internet R, as shown in FIG. 3.

In the example described here, this session is set up in parallel with the Voice over IP session SVIP, which is still active.

Of course, the multimedia session SVID is possible only because the remote gateway $GW_B$ configures its firewall to open a port P corresponding to the RTSP protocol, enabling an incoming connection to be set up.

The main steps of the methods executed by the gateway $GW_A$ in this implementation of the invention are described below with reference to FIG. 4.

During a step E10, the home gateway $GW_A$ creates the local structure $BIL_A$ (see appendix 1), in which it stores the capabilities of the terminals connected to the network $HLAN_A$.

In the implementation of the invention described here, the gateway $GW_A$ communicates with the terminals of its network using the protocol UPnP.

Then, in the step E20, using a network address translation mechanism, the home gateway $GW_A$ creates an exchange structure $BIX_A$ usable by the terminals of the local area network $HLAN_B$.

Then, during a step E30, a Voice over IP session SVIP is set up between the terminals $VIP_A$ and $VIP_B$ of the home networks $HLAN_A$ and $HLAN_B$ via the home gateways $GW_A$ and $GW_B$ and the gateways exchange their structures $BIX_A$, $BIX_B$ in an INVITE message of the signaling protocol SIP for this session.

Then, during a step E40, the home gateway $GW_A$ configures its firewall to enable the terminals of the local area network $HLAN_B$ to initiate multimedia sessions with the terminals of its own network $HLAN_A$.

During a step E60, the home gateway $GW_A$ determines which terminals of its network $HLAN_A$ have the capabilities to benefit from the services offered by the terminals of the network $HLAN_B$.

During the step E60, the home gateway $GW_A$ creates the data structure AGS (see appendix 4).

Then, during a step E70, the home gateway $GW_A$ communicates this structure AGS to the terminals concerned, namely the personal computer $PC_A$ and the set-top box $STB_A$.

In the implementation described here, during a test step E80, the gateway $GW_A$ determines whether the services offered by the terminals of its own network have changed, which may in particular occur if a terminal enters or leaves the local area network $HLAN_A$.

If so, the gateway $GW_A$ sends the gateway $GW_B$ (step E85) an updated exchange structure $BIX_A$ in a RE-INVITE message of the signaling protocol of the Voice over IP session SVIP.

If not, the home gateway $GW_A$ verifies or detects during a test step E90 if there is still a session open between the two gateways, which session may in this example be either the Voice over IP session SVIP or a multimedia session set up between two terminals of the local area networks $HLAN_A$ and $HLAN_B$.

If there is still an open session, the result of the test step E90 is positive and the home gateway $GW_A$ returns to the test step E80 already described.

In the example described here, if the test step E90 determines that there is no longer any session open between the two gateways $GW_A$, $GW_B$, the gateway $GW_A$ closes its port P to secure its network $HLAN_A$.

The invention thus makes it possible to benefit from an audio or video call (for example a VoIP call) set up between a plurality of users to exchange data (for example a user's latest holiday photos) dynamically and automatically from any multimedia medium available in the local area network of one of the users.

Data is exchanged by automatically creating a communications channel in parallel with the audio or video communications channel.

APPENDIX 1

$BIL_A$

Local info base structure {
Security weight: voice
Messaging {
    Machine name: $PC_A$
    Email address: pierre.martin@orange.fr}
File transfer {
    Machine name: $PC_A$
    IP address: 168.1.1.12
    Login: anonymous
    Passwd: anonymous}
Set-top box{
    Machine name: $STB_A$
    IP address: 168.1.1.15
    Login: stb
    Passwd: none}
Web server
    Machine name: $PC_A$
    IP address:168.1.1.20
    URL: http://168.1.1.20/photos}
.........
}

APPENDIX 2

$BIX_A$

Exchange info base structure{
Email address: pierre.martin@orange.fr
File transfer {
    Machine name: $GW_A$
    IP address: 192.167.25.1
    Login: anonymous
    Passwd: anonymous}
Set-top box{
    Machine name: $GW_A$
    IP address: 192.167.25.1
    Login: stb
    Passwd: none}
Web server
    Machine name: $GW_A$
    IP address: 192.167.25.1
    URL: http://192.167.25.1/photos}
.........
}

APPENDIX 3

$BIX_B$

Remote exchange info base structure {
Email address: .martin.dupond@orange.fr
File transfer {
    Machine name: $GW_B$
    IP address: 200.20.156.12
    Login: mdd
    Passwd: martin}
RTSP server{
    Machine name: $GW_B$
    IP address: 200.20.156.12
    Login: video
    Passwd: Martin}
}

APPENDIX 4

AGS

Aggregation structure {
Destination $PC_A$ {
    Security weight: ZERO
    Email address: .martin.dupond@orange.fr
    File transfer {
        IP address: 200.20.156.12
        Login: mdd
        Passwd: martin}
}
Destination $STB_A${
RTSP server {
    IP address: 200.20.156.12
    Login: video
    Passwd: Martin}}}

The invention claimed is:

1. A method that can be used by a first home gateway to supply at least one first terminal connected to that gateway with information for accessing at least one multimedia service offered by at least one remote terminal connected to a second home gateway, said gateways being connected by a telecommunications network, the method comprising:
    setting up a Voice over IP session between a terminal connected to said first gateway and a terminal connected to said second gateway;
    said first gateway receiving multimedia capabilities of the at least one remote terminal connected to said second gateway using a signaling protocol of said Voice over IP session;
    said first gateway determining as a function of said multimedia capabilities the at least one multimedia service offered by said remote terminal; and
    said first gateway supplying only each first terminal which has the multimedia capabilities to access said at least one multimedia service with information necessary for setting up with said remote terminal a multimedia session implementing said multimedia service, wherein:
    said first gateway collects the multimedia capabilities of each first terminal;
    said first gateway determines, based on a comparison of the multimedia capabilities of each first terminal with the multimedia capabilities of said at least one remote terminal, which of said first terminals can access said at least one multimedia service; and
    said first gateway constructs a data aggregation structure based on the results of said comparison, wherein said data aggregation structure includes in association with each of said first terminals said necessary information for setting up a multimedia session with said remote terminal if the multimedia capabilities of said first terminal allow it.

2. The method according to claim 1, wherein said first gateway sends said second gateway multimedia capabilities of the at least one first terminal to which it is connected using the signaling protocol of said Voice over IP session.

3. A first home gateway comprising:
    a processor;
    a memory comprising:
        instructions stored in said memory and executed by said processor for setting up a Voice over IP session between a terminal to which said first home gateway is connected and a terminal connected to a second gateway, said second gateway being connected to said first gateway by a telecommunications network;

instructions stored in said memory and executed by said processor for receiving multimedia capabilities of at least one remote terminal connected to said second gateway using a signaling protocol of said Voice over IP session;

instructions stored in said memory and executed by said processor for determining at least one multimedia service offered by said remote terminal as a function of said multimedia capabilities; and instructions stored in said memory and executed by said processor for supplying only each first terminal to which it said first home gateway is connected which has the multimedia capabilities to access said at least one multimedia service with information necessary for setting up with said remote terminal a multimedia session implementing said multimedia service;

instructions stored in said memory and executed by said processor for causing said first gateway to collect the multimedia capabilities of each first terminal;

instructions stored in said memory and executed by said processor for causing said first gateway to determine, based on a comparison of the multimedia capabilities of each first terminal with the multimedia capabilities of said at least one remote terminal, which of said first terminals can access said at least one multimedia service; and instructions stored in said memory and executed by said processor for causing said first gateway to construct a data aggregation structure based on the results of said comparison, wherein said data aggregation structure includes in association with each of said first terminals said necessary information for setting up a multimedia session with said remote terminal if the multimedia capabilities of said first terminal allow it.

4. A non-transitory computer-readable medium storing a computer program including instructions for executing the steps of the method according to claim 1 when said program is executed by a computer.

5. A communications system for setting up a multimedia session between at least a first terminal connected to a first gateway and at least a second terminal connected to a second gateway, said first and second gateways being interconnected by a telecommunications network, wherein said first gateway is configured to send the second gateway, using a signaling protocol of a Voice over IP session set up between a terminal connected to said first gateway and at least one second terminal connected to said second gateway, multimedia capabilities of at least one first terminal connected to said first gateway;

said second gateway being configured to determine, as a function of said multimedia capabilities, at least one multimedia service offered by said first terminal; and wherein said second gateway is configured to supply only each second terminal to which it is connected which has the multimedia capabilities to access said at least one multimedia service with information necessary for setting up with said first terminal a multimedia session implementing said at least one multimedia service and wherein:

said second gateway collects the multimedia capabilities of each terminal connected to said first gateway;

said second gateway determines, based on a comparison of the multimedia capabilities of each terminal connected to said first gateway with the multimedia capabilities of at least one remote terminal connected to said second gateway, which of said terminals connected to said second gateway can access said at least one multimedia service; and said second gateway constructs a data aggregation structure based on the results of said comparison, wherein said data aggregation structure includes in association with each of said terminals connected to said second gateway said necessary information for setting up a multimedia session with said at least one terminal connected to said first gateway if the multimedia capabilities of said at least one terminal connected to said second gateway allow it.

* * * * *